United States Patent [19]
Ringland

[11] 3,965,426
[45] June 22, 1976

[54] FREQUENCY MODULATED SIGNAL PRE-AMPLIFIER WITH AMPLITUDE MODULATED SIGNAL BYPASS

[75] Inventor: Robert S. Ringland, Burlington, Iowa

[73] Assignee: Tandy Corporation, Forth Worth, Tex.

[22] Filed: Jan. 10, 1974

[21] Appl. No.: 432,160

[52] U.S. Cl................................ 325/375; 343/701
[51] Int. Cl.².......................................... H04B 1/16
[58] Field of Search ........... 325/316, 318, 365, 373, 325/374, 375, 384, 380, 485, 312, 352, 315, 317; 330/31, 124 R, 126; 343/701

[56] References Cited
UNITED STATES PATENTS

| | | | |
|---|---|---|---|
| 2,679,001 | 5/1954 | Tomcik | 325/384 |
| 2,935,695 | 5/1960 | Wlasuk | 330/126 X |
| 2,959,644 | 11/1960 | Grace | 325/361 X |
| 3,064,195 | 11/1962 | Freen | 325/308 |
| 3,243,708 | 3/1966 | Manson | 325/317 |
| 3,287,644 | 11/1966 | Poppy | 325/317 X |
| 3,611,198 | 10/1971 | Ma | 325/379 X |
| 3,614,628 | 10/1971 | Ringland | 325/365 |
| 3,723,884 | 3/1973 | Asplin | 325/308 X |

*Primary Examiner*—Benedict V. Safourek

[57] ABSTRACT

For use with radio receivers adapted to receive both frequency and amplitude modulated signals, a frequency modulated signal preamplifier adapted to be serially connected between the antenna input lead and antenna connector of such a radio, the pre-amplifier including means for separating the amplitude modulated and frequency modulated signals, amplifying the frequency modulated signals, and recombining the signals for input at the antenna input terminal of the receiver.

10 Claims, 2 Drawing Figures

FREQUENCY MODULATED SIGNAL PRE-AMPLIFIER WITH AMPLITUDE MODULATED SIGNAL BYPASS

BACKGROUND OF THE INVENTION

1. Field of the Invention

The present invention relates to radio frequency preamplifiers and in particular to a pre-amplifier for use with receivers adapted to receive both frequency and amplitude modulated signals. The pre-amplifier includes means for separating the amplitude and frequency modulated signals, amplifying the frequency modulated signals only, and recombining the signals for injection into the receiver.

2. Description of the Prior Art

Pre-amplifier circuits are well known and widely used. Typically, such circuits are used to increase the magnitude of received signals in exactly the form in which they are received, that is, without any attempt to demodulate or otherwise derive the intelligence contained therein. Such circuits are of particular value for increasing the reception sensitivity of receivers adapted to demodulate frequency modulated radio signals.

It is also known to provide radio receivers which are adapted to receive both amplitude and frequency modulated radio signals, and such receivers are becoming increasingly common for automotive use. In this latter application, a pre-amplifier for frequency modulated signals is of particular value due to the obvious limitations in attaching specialized antenna systems to a moving vehicle.

However, it is also well known that an amplifier circuit and in particular a pre-amplifier circuit also receives and amplifies noise in direct proportion to the bandwidth of the pre-amplifier. Correspondingly, prior art pre-amplifiers which are adapted for use with receivers capable of demodulating both amplitude and frequency modulated signals have been adapted to receive signals over exceptionally broad bandwidths to thereby receive and pass signals in both amplitude modulated and frequency modulated frequency bands. Correspondingly, such pre-amplifiers, in addition to increasing the strength of the received frequency modulated signals, have also reduced the signal-to-noise ratio of frequency modulated signals thereby diminishing the value and effectiveness of the pre-amplifier.

SUMMARY OF THE INVENTION

Broadly, the present invention is a pre-amplifier for use with a radio receiver and adapted to receive both amplitude and frequency modulated signals, the pre-amplifier including circuitry for separating the amplitude modulated and frequency modulated signals prior to amplification thereof, amplifying the frequency modulated signal only, and recombining the signals for injection into the receiver. Since the amplifier portion of the pre-amplifier receives and amplifies only the frequency modulated signals, the bandwidth of the amplifier portion can be substantially reduced thereby enhancing the signal-to-noise ratio of the amplified frequency modulated signal.

In a specific embodiment of the invention, the pre-amplifier includes input and output connectors adapted to engage the antenna lead wire and receiver input connectors, respectively, of a conventional automotive receiver. The pre-amplifier can be enclosed in either a metal or plastic enclosure which may be rectangular from which extends input and output leads provided with connectors, respectively, whereby the pre-amplifier may be serially connected between the receiver input connector and antenna lead-in wire connector.

In a specific embodiment of the invention, the pre-amplifier is provided with blocking circuits which prevent the passage of amplitude modulated signals in the forward direction through the frequency modulated amplifying circuitry and backwardly into the output of the frequency modulated signal amplifying circuitry, and a filter network in the power supply input of the pre-amplifier to remove noise signals such as ignition noise therefrom.

It is therefore an object of the invention to provide a pre-amplifier for use with radio receivers adapted to receive both amplitude and frequency modulated signals.

It is another object of the invention to provide such a pre-amplifier which includes means for separating the amplitude and frequency modulated signals, amplifying the frequency modulated signals only and recombining the amplitude and frequency modulated signals for injection into the receiver.

It is still another object of the invention to provide a pre-amplifier which is simply and easily serially connected between the receiver and the receiver antenna input lead.

It is another object of the invention to provide a pre-amplifier for use with receivers adapted to receive both frequency and amplitude modulated signals which has a substantially reduced bandwidth and a reduced noise.

Yet another object of the invention is to provide such a pre-amplifier which includes means for preventing feedback of amplitude modulated signals into the frequency modulated signal amplifying portions thereof.

Another object of the invention is to provide such a pre-amplifier which includes a filter network for removing ignition noise therefrom when the device is used with automotive type receivers.

Yet another object of the invention is to provide such a pre-amplifier which is small in size, economical to produce, and very simple to install in existing receiving circuits.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF A SPECIFIC EMBODIMENT

Figure 1:
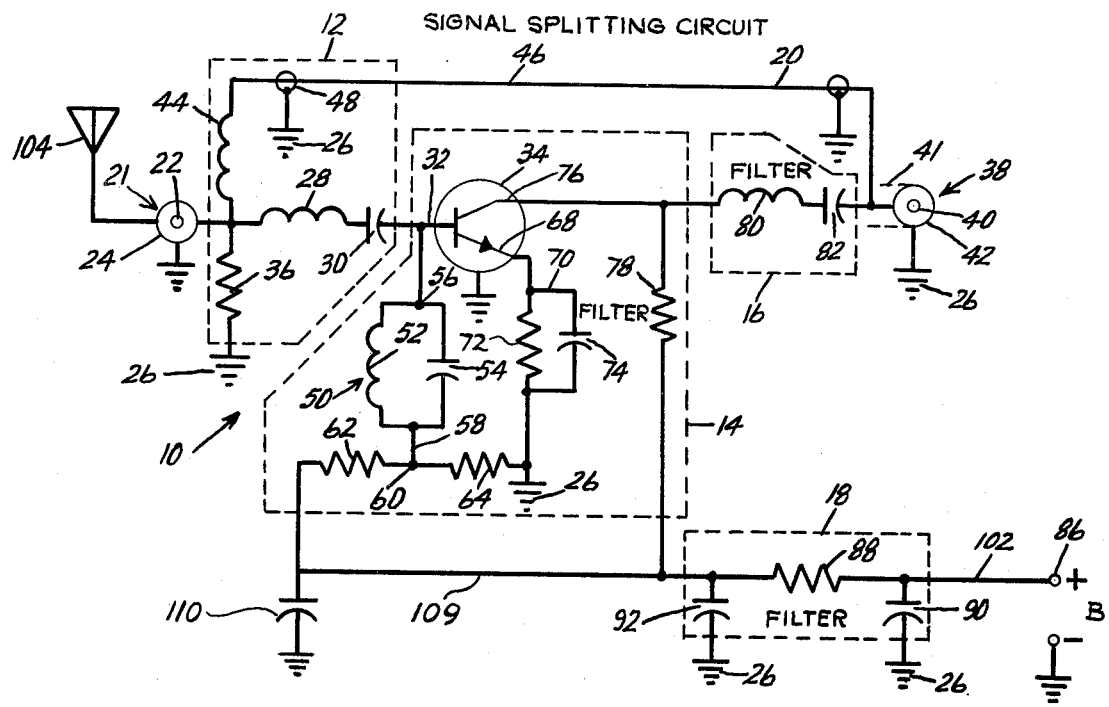
FIG. 1 is an electrical schematic of the pre-amplifier in accordance with the present invention.

Referring now to the drawings, there is shown in FIG. 1 an electrical schematic of a pre-amplifier 10 for use with receivers adapted to receive both amplitude and frequency modulated signals (hereinafter referred to as AM and FM signals, respectively). The pre-amplifier 10 includes a signal splitting circuit enclosed in dashed box 12, an FM signal amplifier in dashed box 14, an AM signal blocking circuit and FM signal impedance matching circuit in dashed box 16, a power supply filter circuit in dashed box 18, and an AM signal bypass loop 20.

Pre-amplifier 10 is provided with a conventional coaxial type input connector or receptacle 21 having terminals 22, 24. Terminal 24 is connected to ground 26 and terminal 22 is connected electrically in series with a first inductor 28 and capacitor 30 to the base 32 of an amplifier transistor 34. A bleed resistor 36 is connected between terminal 22 and ground 26. Pre-amplifier 10 further includes a conventional coaxial type output connector or plug 38 having terminals 40, 42. Input connector 22 is connected to output terminal 40 through a second inductor 44. Inductor 28 and capacitor 30 are selected to have a relatively large L/C ratio such that the two elements will pass signals having frequencies in the FM signal bands while the small capacitance of capacitor 30 effectively blocks signals having frequencies in the lower frequency AM signal bands. Similarly, inductor 44 has a larger inductance value such that it effectively blocks the passage of higher frequency FM signals while passing signals in the lower AM frequency bands.

To minimize noise such as, for example, noise generated by the ignition system of an automobile, conductor 46 connecting inductor 44 to terminal 40 is passed through a copper pipe both ends of which of which are connected to ground 26.

A tuned circuit 50 includes a third inductor 52 and a capacitor 54 connected in parallel and has one terminal 56 thereof connected to base 32. The other terminal 58 of tuned circuit 50 is connected to tap 60 of a voltage divider including resistors 62, 64. Inductor 52 and capacitor 54 are selected to have a relatively low L/C ratio such that the circuit has a relatively high impedance to signals in the FM radio frequency bands and a relatively low impedance to signals in the AM radio frequency bands. Emitter 68 of transistor 34 is coupled to ground 26 through a parallel circuit 70 which includes a resistor 72 and capacitor 74. Collector 76 of amplifier transistor 34 is connected to one terminal of a load resistor 78.

Collector 76 is further connected to output connector terminal 40 via a series connected fourth inductor 80 and capacitor 82. Inductor 80 and capacitor 82 are selected to have a relatively low impedance to signals in the FM frequency bands and a relatively high impedance to signals in the AM radio frequency band such that AM signals on conductor 20 are effectively blocked thereby and will not be applied or fed back to the collector 76 of transistor 34.

Power for the pre-amplifier is provided from a suitable source of direct current operating potential. Where the pre-amplifier is used with an automotive type radio receiver, the source will be the automobile battery (not shown). The operating potential is applied to the power supply input terminal 86. Terminal 86 is coupled to load resistor 78 and voltage divider resistor 62 via a series connected resistor 88. A pair of filter capacitors 90, 92, are connected from the opposite ends, respectively, of resistor 88 to ground 26. Capacitor 90 has a relatively large value and functions to bypass noise signals such as typically generated by the ignition system of an automobile. Capacitor 92 is of a relatively small value and functions as a shunt to bypass stray FM radio frequency signals to ground to prevent feedback thereof to the base 32 of transistor 34 via voltage dividers 62, 64. Capacitor 110 also prevents feedback by being connected from DC supply line 109 to ground at a point near resistor 62.

Figure 2:
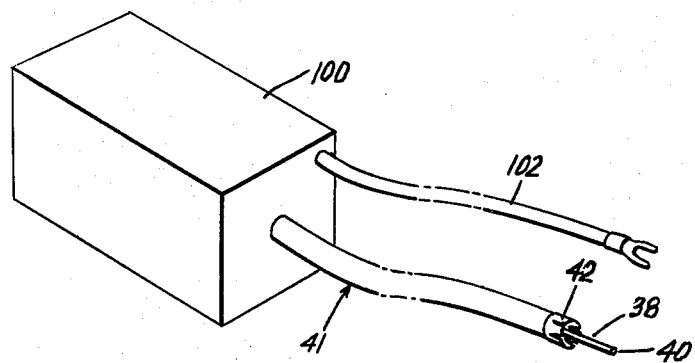
FIG. 2 is a perspective drawing showing the physical arrangement of the pre-amplifier enclosure in accordance with the present invention.

Referring now to FIG. 2, pre-amplifier 10 is of small size, being manufactured of miniaturized components, and is received within a rigid metal or plastic enclosure 100. To the loop 20 and output circuit 16 is connected a coaxial cable 41 which extends from one end of enclosure 100, the connnector 38 being connected to the distal end of cable 41. The connector 38 includes outer cylindrical terminal 42 and a pin-like terminal 40. Terminals 40, 42 are conductively secured to the ends of the conductors of the cable 41, the central conductor of cable 41 being connected to pin 40 and the shield thereof to the cylindrical terminal 42. This shield is connected to ground in the pre-amplifier. Connector 38 is conventional and is dimensioned to be compatible with the standardized coaxial type antenna input terminal or receptacle commonly found in automobile type radio receivers. This receiver output terminal has a grounded sleeve (not shown) which contacts terminal 42, and in the receiver a negative potential power supply circuit is provided which is connected to the grounded sleeve.

Similarly, pre-amplifier input connector 21 includes an outer hollow cylindrical terminal 24, and a smaller diameter hollow cylindrical connector (not shown in FIG. 2). Again, connector 21 is dimensioned to be complementary to the conventional automotive radio antenna lead-in wire male connector. Positive potential for the pre-amplifier 10 is provided through a suitable connector 102 which is connected to a suitable point of an automobile power supply or electrical system (not shown). Negative potential is provided through the shield of output cable 41 which is grounded to the receiver when connector 38 is plugged into the receiver antenna connector (not shown), the receiver ground circuit being connected to the negative side of the automobile battery circuit.

In operation AM and FM radio signals are received by an antenna 104. These signals are applied across input terminals 22, 24. The AM signals are effectively blocked by capacitor 30 and are passed with minimal attenuation to output connector 38, terminal 40, through inductor 44. Conversely, FM signals of higher frequency are passed with minimal attenuation through inductor 28 and capacitor 30 to the base 32 of the transistor 34, while these latter signals are effectively prevented from being applied directly to output connector 38 by inductor 44.

The FM signals passed through inductor 28 and capacitor 30 are applied across a tuned load in the form of tuned circuit 50 thereby providing a drive signal for amplifier transistor 34. The FM signals are amplified by the transistor 34. It should be observed that the parallel circuit including resistor 72 and capacitor 74 provides both stabilizing feedback for the amplifier circuit and functions to control the bandwidth of the amplifier 14.

The amplified FM signals are tuned and matched to the output line by the series resonant circuit consisting of inductor 80 and capacitor 82 and applied to output connector 38, terminal 40. Output connector 38 is connected directly to the antenna input terminal (not shown) of the conventional AM-FM signal receiver of an automobile, the latter being connected to the automobile battery circuit such that the negative potential thereof is applied to the receiver chassis and ground circuit and the counterpart of the antenna connector which connects to the terminal portion 41.

The filter circuit 18 between the pre-amplifier 10 and source of operating potential (not shown) effectively eliminates most stray noise signals such as the ignition noise typically encountered in the automotive installations. Similarly, the AM signals passed to output terminal 40 via conductor 46 are effectively shielded from noise pickup by use of the copper tube shield.

The pre-amplifier of the present invention is small. In a preferred embodiment, the entire pre-amplifier is mounted within a metallic or plastics enclosure 100. For this reason, the pre-amplifier of the present invention can be installed in the antenna circuit of the typical automotive-type receiver by plugging the automobile antenna coaxial pin type connector (not shown) into receptacle 21 and male connector 38 into the receiver antenna receptacle.

The positive potential lead 102 is connected to a positive potential point in the automobile battery circuit. Negative potential for the pre-amplifier is obtained from the receiver via the ground side of the output receptacle and the outer conductor or shield of cable 41 which is grounded in the pre-amplifier. As explained previously, the automobile battery circuit is connected to the receiver, with the negative potential side being grounded and thus connected to the sleeve portion of the receiver output receptacle, this sleeve portion contacting the cylindrical terminal 42. Since the shield conductor of cable 41 is connected to cylindrical terminal 42, negative ground potential is provided for the pre-amplifier.

Thus, power supply connection to the pre-amplifier is effectively achieved merely by attaching a single lead, lead 102, to a positive potential point in the automobile battery or electrical circuit, the negative potential being obtained by merely plugging pre-amplifier cable 41 into the receiver antenna receptacle.

The entire circuit is relatively simple and is effective in increasing the strength of frequency modulated signals. Simultaneously, because the pre-amplifier circuit separates the amplitude modulated and frequency modulated signals at its input and amplifies only the frequency modulated signals, the band pass of the amplifier circuit can be substantially reduced. This in turn significantly enhances the signal-to-noise ratio characteristics of the pre-amplifier over typical pre-amplifiers wherein a broad pass band is used in both amplitude and frequency modulated signals are amplified.

In a working embodiment of the invention, the following circuit values were used:

| | | |
|---|---|---|
| Transistor | 34 | BFX-89 |
| Inductors | 28 | 9½ turns, ¼" I.D. (36 TPI) |
| | 44 | 4.7 Micro Henrys (R.F. choke) |
| | 52 | 2½ turns, ¼" I.D. (36 TPI) |
| | 80 | 7½ turns, ¼" I.D. (36 TPI) |
| Capacitors | 30, 82 | 10 pfd. |
| | 54 | 150 pfd. |
| | 74 | 300 pfd. |
| | 90 | .47 mfd. |
| | 92 | .005 mfd. |
| | 110 | .001 mfd. |
| Resistors | 36 | 100 K ohms |
| | 62 | 4.7 K ohms |
| | 64 | 2.2 K ohms |
| | 72 | 330 ohms |
| | 88 | 2700 ohms |

Gain typically 14–15 db at FM band center (98 MHZ), and not more than 1 db down from band center at the FM band limits 88 and 108 MHZ, respectively. Amplifier pass band -76–120 MHZ is 3 db down at limits.

While there have been described above the principles of this invention in connection with specific apparatus, it is to be clearly understood that this description is made only by way of example and not as a limitation to the scope of the invention.

What is claimed is:

1. For use with a radio receiver for receiving both frequency and amplitude modulated signals, said frequency modulated signals being in a first frequency band and said amplitude modulated signals being in a second frequency band different from said first frequency band, the receiver including an antenna, an antenna lead, a receiver input circuit and complementary electrical connectors affixed to said antenna lead and said receiver input circuit, respectively, for coupling the antenna lead to the receiver input circuit; a frequency modulated signal pre-amplifier comprising a pre-amplifier input connector adapted to engage said antenna lead connector and a pre-amplifier output connector for engaging said receiver input circuit connector, band splitting circuit means coupled to said pre-amplifier input connector for receiving and separating said first and second frequency bands, said band splitting means including an amplitude modulated signal output terminal connected to said pre-amplifier output connector and a frequency modulated signal output terminal, and radio frequency amplifier means coupled between said frequency modulated signal input terminal and said pre-amplifier output connector for amplifying said frequency modulated signals, said amplifier means including tuned circuit means for limiting the frequency pass band of said amplitude means, said amplifier means providing amplification to the signals in said first frequency band which is substantially greater than the amplification of the signals in said second frequency band.

2. The pre-amplifier of claim 1 wherein said band splitting means includes a capacitor and a first inductor connected electrically in series to said pre-amplifier input connector and a second inductor connected to said pre-amplifier input connector, said series connected capacitor and first inductor having a low impedance to radio frequency signals in the frequency modulated radio frequency bands and a high impedance to radio frequency signals in the amplitude modulated frequency band, said second inductor having a high impedance to radio frequency signals in the frequency modulated frequency band and a low impedance to radio frequency signals in the amplitude modulated frequency bands.

3. The pre-amplifier of claim 2 wherein said second inductor is connected electrically in series between said pre-amplifier input connector and said pre-amplifier output connector, and further including a blocking circuit connected electrically in series between the collector of said transistor and said pre-amplifier output connector, said blocking circuit including a third inductor and a second capacitor connected electrically in series, said series connected third inductor and second capacitor having a low impedance to radio frequency signals in the frequency modulated radio frequency band and a high impedance to lower radio frequency signals in the amplitude modulated radio frequency band.

4. The pre-amplifier of claim 2 wherein said amplifier means includes a transistor having its base coupled to said capacitor and first inductor, a tuned circuit having coupled between said base and ground and having a high impedance to signals in the frequency modulated radio frequency band, said transistor having a load circuit, said load circuit including a band pass filter for limiting the pass band of said amplifier.

5. The pre-amplifier of claim 4 wherein said transistor is an NPN transistor, said band pass filter including a capacitor connected electrically in series between the emitter of said transistor and ground.

6. The pre-amplifier of claim 5 wherein said second inductor is connected to said pre-amplifier output connector through a shielded conductor, the shield of said conductor being grounded.

7. The pre-amplifier of claim 6 wherein said pre-amplifier is adapted for use with an automotive type receiver, and further includes a power supply filter circuit connected between an automotive electrical system and said pre-amplifier, said filter circuit including a resistor connected electrically in series between said electrical system and said pre-amplifier, a first filter capacitor connected between one terminal of said resistor and ground and a second filter capacitor connected between the opposite terminal of said resistor and ground, said first mentioned resistor having a low impedance to radio frequency signals to thereby remove ignition noise from said supply voltage, said second mentioned capacitor having a low impedance to radio frequency signals in the frequency modulated radio frequency band to thereby shunt said last mentioned signals to remove same from said energy source.

8. The pre-amplifier of claim 1 in which said input and output connectors are of the coaxial type, the input connector being a receptacle and the output connector being a plug, said connectors having outer sleeves, respectively, said pre-amplifier including positive and negative supply voltage circuits, said outer sleeves being conductively connected to said negative voltage circuit, and a lead connected to said positive supply circuit and adapted to be connected to a source of positive supply voltage.

9. The apparatus of claim 8 in which said pre-amplifier is contained in enclosure and having input and output coaxial leads extending therefrom, said input and output connectors being connected to the distal ends of said coaxial leads, respectively, whereby connection of said output connector to the receiver results in negative potential being supplied to said negative voltage circuit.

10. The pre-amplifier of claim 1 wherein said amplifier means provides amplification to the signals in said first frequency band, said signals in said second frequency band being unamplified.

* * * * *

UNITED STATES PATENT OFFICE
CERTIFICATE OF CORRECTION

Patent No. 3,965,426            Dated June 22, 1976

Inventor(s) Robert S. Ringland

It is certified that error appears in the above-identified patent and that said Letters Patent are hereby corrected as shown below:

| | |
|---|---|
| Col. 1, line 41, | --the-- should be inserted between "both" and "amplitude". |
| Col. 4, line 8 | "connenctor" should be --connector--. |
| Col. 4, line 31 | "connector" should be --conductor--. |

Claim 4, Col. 7, line 1  "having" should be --being--.
Claim 7, Col. 7, line 26 "resistor" should be --capacitor--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,965,426

DATED : June 22, 1976

INVENTOR(S) : Robert S. Ringland

It is certified that error appears in the above-identified patent and that said Letters Patent are hereby corrected as shown below:

Col. 3, line 27, after "pipe" insert --48--.
Claim 1, Col. 6, line 21, after "connector" insert a comma.
Claim 1, Col. 6, line 28, after "connector" insert a comma.
Claim 1, Col. 6, line 31, "input" should be --output--.
Claim 1, Col. 6, line 34, "amplitude" should be --amplifier--.
Claim 2, Col. 6, line 46, change "bands" to --band--.
Claim 2, Col. 6, line 52, change "bands" to --band--.
Claim 3, Col. 6, line 53, "2" should be --4--.
Claim 7, Col. 7, line 25, change "resistor" to --filter capacitor--.
Claim 7, Col. 7, line 27, change "supply voltage" to --electrical system--.
Claim 7, Col. 8, line 1, after "mentioned" insert --filter--.
Claim 7, Col. 8, line 4, change "energy source" to --electrical system--.

Signed and Sealed this

Twenty-ninth Day of May 1979

[SEAL]

Attest:

RUTH C. MASON
Attesting Officer

DONALD W. BANNER
Commissioner of Patents and Trademarks